March 3, 1931.  D. GILBERTSON  1,794,607
QUACK GRASS DESTROYER
Filed April 15, 1930  3 Sheets-Sheet 1

Inventor
D. Gilbertson
By Clarence A. O'Brien
Attorney

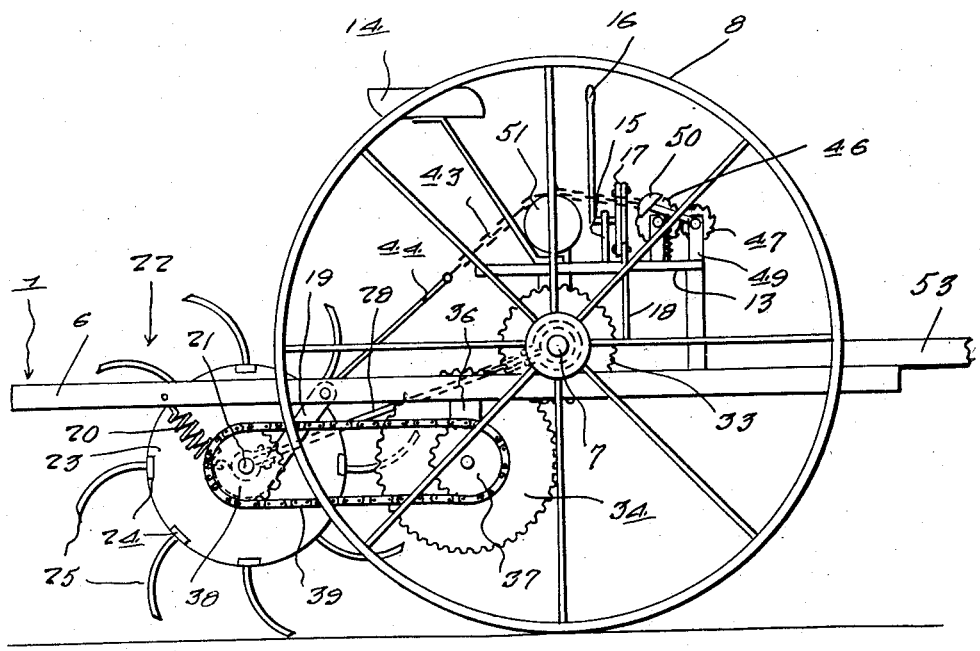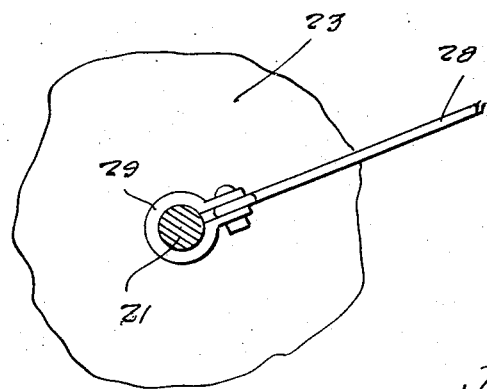

March 3, 1931. D. GILBERTSON 1,794,607
QUACK GRASS DESTROYER
Filed April 15, 1930 3 Sheets-Sheet 3
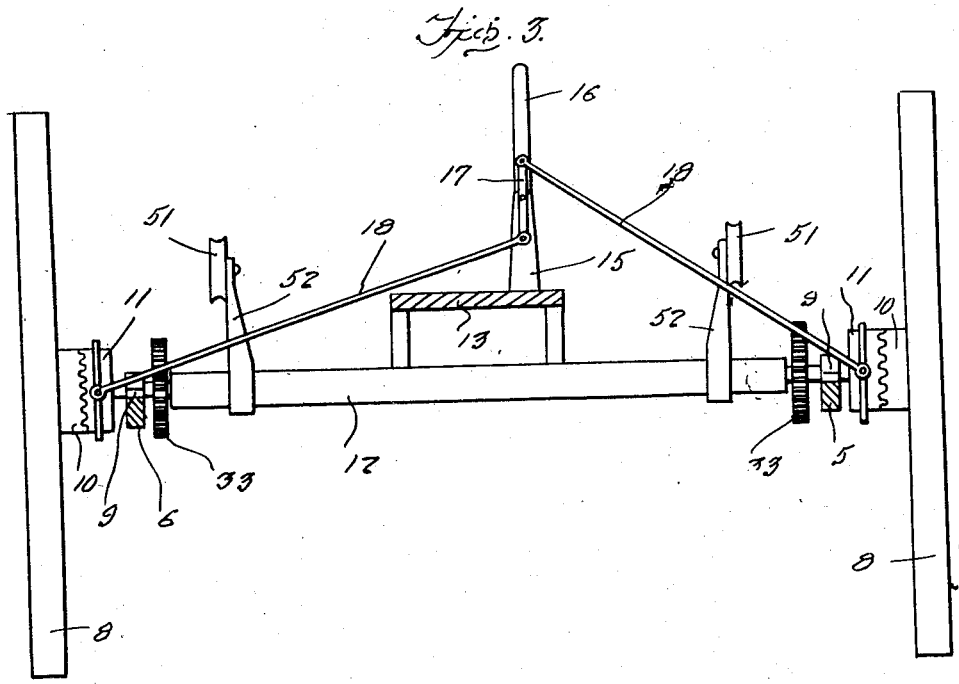
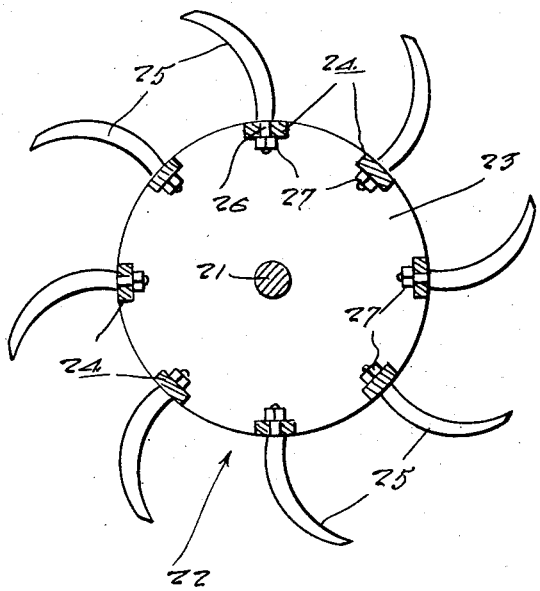
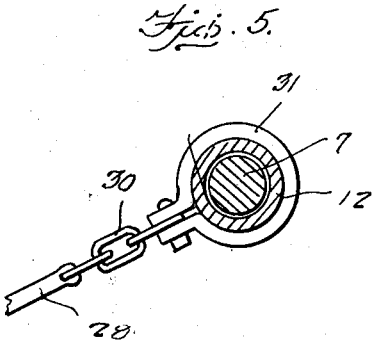
Inventor
D. Gilbertson
By Clarence A. O'Brien
Attorney Patented Mar. 3, 1931

1,794,607

UNITED STATES PATENT OFFICE

DENA GILBERTSON, OF MILWAUKEE, WISCONSIN

QUACK-GRASS DESTROYER

Application filed April 15, 1930. Serial No. 444,512.

This invention relates to new and useful improvements in machines for destroying quack grass and other undesirable vegetation and has for its primary object to provide, in a manner as hereinafter set forth, a machine of this character embodying a rotatable toothed drum adjustably supported on a wheeled frame and having novel means operatively associated therewith for manually adjusting said drum vertically with respect to the supporting frame therefor and for maintaining the same in raised inoperative position when it is so desired.

Other objects of the invention are to provide a quack grass destroyer of the character described which will be simple in construction, strong, durable, efficient in its use and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 2 is a view in side elevation thereof.

Figure 3 is a vertical transverse sectional view through the machine taken substantially on the line 3—3 of Figure 1.

Figure 4 is a detail view in section taken through the rotary toothed drum substantially on the line 4—4 of Figure 1.

Figure 5 is a detail view showing the means for coupling the drum supporting shaft to the housing on the axle.

Figure 6 is a detail view showing the opposite end portion of the device illustrated in Figure 5 connected to the drum shaft.

Figure 1:
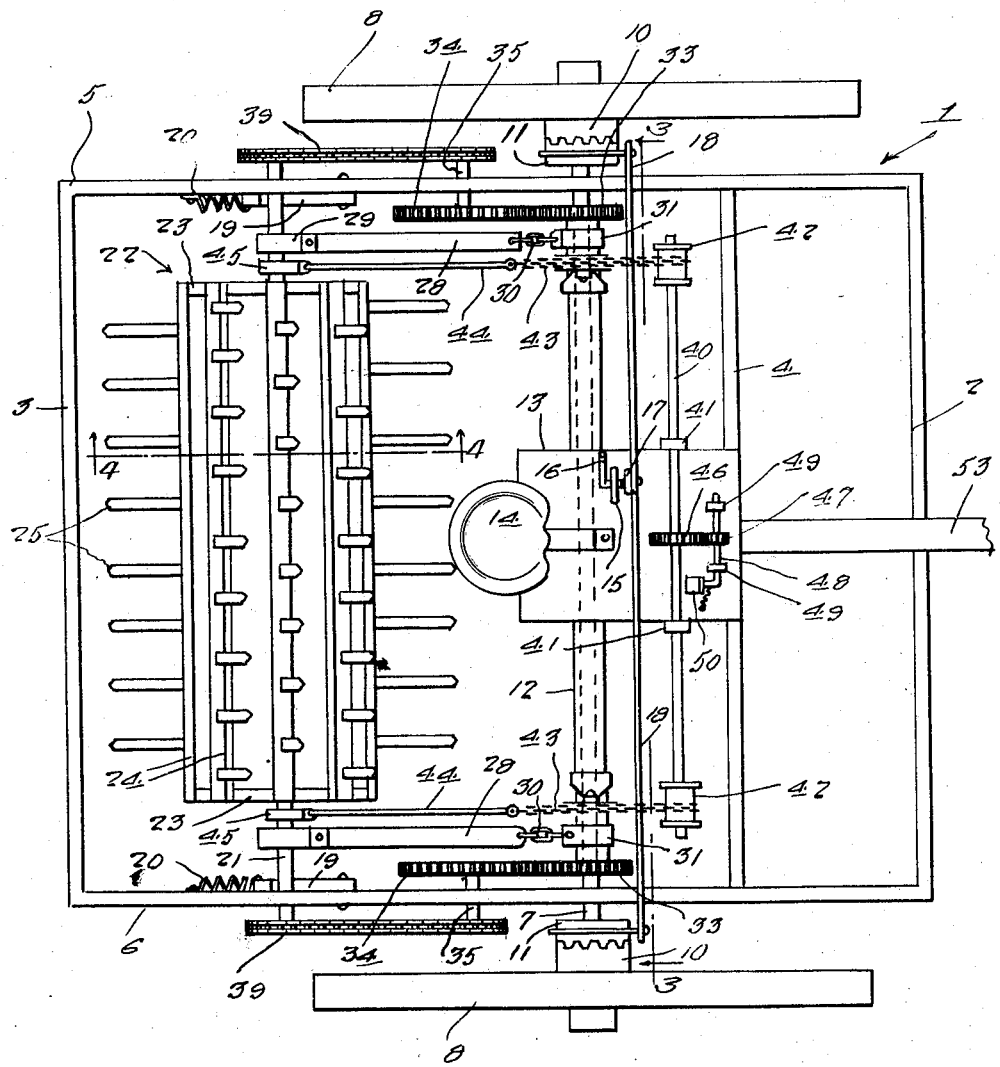
Figure 1 is a view in top plan of a quack grass destroyer constructed in accordance with this invention.

Referring to the drawings in detail, it will be seen that the reference numeral 1 designates generally a substantially rectangular frame including front and rear cross bars 2 and 3, respectively, an intermediate cross bar 4 and the longitudinally extending side bars 5 and 6. Extending rotatably through the intermediate portions of the longitudinal side bars 5 and 6 of the frame 1 is a supporting axle 7 having the wheels 8 mounted for rotation on its opposite end portions outwardly of the opposite sides of said frame 1. As seen in Figure 3 of the drawings, the axle 7 is journaled on the frame 1 through the medium of the journal boxes 9.

Fixed to the inner side of each of the wheels 8 for rotation therewith is a clutch 10 adapted for engagement by a complementary cultch 11 which is keyed for sliding movement on the axle 7 in a manner to operatively connect said axle to the wheels for rotation therewith when the clutches 10 and 11 are in engaged position. A tubular housing 12 is rotatably mounted longitudinally on the axle 7 and has its opposite end terminating in spaced relation to the side bars 5 and 6 of the frame 1. A horizontally disposed platform 13 is supported in elevated position on the cross bar 4 of the frame and the housing 12. An operator's seat 13 is mounted on the rear portion of the platform 14 as clearly illustrated in Figure 1 of the drawings. A standard 15 is rigidly mounted in vertical position on the platform 13 adjacent the operator's seat 14 and a lever 16 is mounted for transverse swinging movement in a vertical plane on the upper end portion of the standard 15 through the medium of a right angularly disposed lower end portion which extends rotatably through said standard, as best illustrated in Figure 1 of the drawings. A bar 17 is fixed on the free end portion of the angular extension on the lower end of the lever 16 and said bar is disposed in parallelism with said lever, as seen in Figure 3. Rods 18 are pivotally connected to the free end portions of the bar 17 and said rods extend outwardly and are operatively connected to the shiftable clutches 11 in a manner to move the same longitudinally on the axle 7 upon actuation of the lever 16.

A pair of rearwardly and downwardly extending hook-shaped brackets 19 are pivotally connected to the side bars 5 and 6 of the frame 1 in rearwardly spaced relation to the axle 7 and the free ends of said brackets are yieldingly connected to the side bars 5 and 6 by the coil spring 20. A horizontally disposed transversely extending shaft 21 is rotatably supported on the brackets 19 and fixed on said shaft for rotation therewith is a drum designated generally by the reference numeral 22 and, as clearly illustrated in Figure 4 of the drawings, comprising the end disks 23 in the peripheries of which are secured in circumferentially spaced relation the bars 24 upon each of which is mounted in spaced relation a series of curved elongated teeth 25 having threaded shanks 26 extending through said bars 24 and having a securing nut 27 threaded thereon.

A pair of coupling bars 28 are rotatably connected, at one end, to the shaft 21 through the medium of the loop 29 (see Figure 6) which is secured to each of said coupling bars, said loops encircling the shaft between the disks 23 and the side bars 5 and 6 of the frame. The coupling bars 28 are loosely connected to the opposite end portions of the tubular housing 12 through the medium of the chain links 30 and the clamps 31 which encircle said housing. The bars 28 constitute draw bars for connecting the shaft 21 and the drum 22 thereon to the housing 12.

A gear 33 is fixed on the axle 7 adjacent the opposite ends of the housing 12 and said gear 33 is constantly in mesh with a comparatively large gear 34 fixed on the inner ends of a shaft 35, one end of the shaft 35 extending rotatably through the lower end portion of a supporting bracket or arm 36 which depends from the side bars 5 and 6 of the frame. Aligned sprocket gears 37 and 38 are fixed on the outer end portions of the shafts 35 and 21, respectively, and a sprocket chain 39 is trained thereover to operatively couple the same together.

A horizontally disposed transversely extending shaft 40 is mounted for rotation on the platform 13 through the medium of the standards 41 and fixed on the opposite end portion of said shaft 40 is a spool 42. Chains 43 are windable on the spools 42 and having one end connected to the shaft 21 through the medium of the rods 44 and the coupling loops 45 which are rotatably disposed about said shaft 21. A gear 46 is fixed on the shaft 40 between the standards 41 and said gear is constantly in mesh with a pinion gear 47 fixed on the shaft 48 which is rotatably mounted in the standards 49 which extend upwardly from the forward portion of the platform 13. A foot operated crank 50 is formed integrally on one end of the shaft 48 to provide means for rotating the drums 42 in a manner to wind the chains 43 thereon. It should be here mentioned that the chains 43 are trained over the grooved pulleys 51 which are mounted rotatably on the upper ends of the arms 52 which are fixed on the opposite end portions of the tubular housing 12, as clearly illustrated in Figure 3 of the drawings.

The reference numeral 53 designates a tongue for connecting the machine to a suitable source of power.

In use, the drum shaft 21 is disposed in the hooked end portion of the brackets 19 and when the clutches 11 are engaged with the clutches 10 the toothed drums 22 will be rotated in an obvious manner, in a manner to dig the quack grass from the ground. The curved configuration of the teeth 25 as well as the staggered arrangement of said teeth on the drum will cause the grass to be pulled entirely out of the ground and carried up over the drum and again deposited on the ground rearwardly thereof. When it is desired to adjust the drum in a manner to regulate the depth to which the teeth 25 will dig, the crank 50 is operated in a manner to wind the chains 43 on the spools 42 and thus draw the drum shaft 21 upwardly on the brackets 19. By operating the lever 16, the clutches 11 are disengaged from the clutches 10 and the driving connection to this drum 22 is thus broken, as will be apparent.

It is believed that the many advantages of a quack grass destroyer contructed in accordance with this invention will be readily understood, and although the preferred embodiment of the invention is as illustrated and described, it is to be understood that changes in the details of construction may be had which will fall within the scope of the invention as claimed.

What is claimed is :—

1. A quack grass destroyer of the character described comprising a wheeled frame, a pair of brackets pivotally connected to the frame and depending therefrom and terminating in hook-shaped end portions, coil springs connecting said hooked end portion to the frame, a shaft supported for rotation on the brackets, a toothed drum fixed on the shaft for rotation therewith, manually controlled means for operatively connecting the shaft to the wheels for actuation thereby, a pair of spools mounted for rotation on the frame, means windable on the spools and connected to the shaft in a manner to shift the same on the brackets, and manually operable means for actuating the spools.

2. A quack grass destroyer of the character described comprising a frame, a transversely extending axle mounted for rotation on the frame, supporting wheels mounted for rotation on the axle, manually operable clutches for connecting the axle to the wheels for rotation therewith, a toothed drum, a pair of hook-shaped brackets pivotally mounted for swinging movement on the frame and depending therefrom, springs connecting the free end portions of the brackets to the frame, a drum supporting shaft mounted for rotation on the brackets, said drum adapted to be shifted on said brackets, means operatively connecting the drum supporting shaft to the axle for actuation thereby, a housing mounted longitudinally on the axle, pulleys supported for rotation on the housing, a horizontally disposed platform mounted on the frame, a pair of spools supported for rotation on the platform, chains windable on the spools and trained over the pulleys and operatively connected to the drum supporting shaft and means for rotating the spools.

In testimony whereof I affix my signature.

Mrs. DENA GILBERTSON.